(12) United States Patent
Liu et al.

(10) Patent No.: US 11,025,466 B2
(45) Date of Patent: Jun. 1, 2021

(54) REFERENCE SIGNAL CONFIGURATION METHOD AND APPARATUS AND TRAINING FIELD CONFIGURATION METHOD AND APPARATUS

(71) Applicant: HUAWEI TECHNOLOGIES CO., LTD., Guangdong (CN)

(72) Inventors: Jinnan Liu, Beijing (CN); Dejian Li, Beijing (CN); Jiamin Chen, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 12 days.

(21) Appl. No.: 16/401,729

(22) Filed: May 2, 2019

(65) Prior Publication Data
US 2019/0260621 A1     Aug. 22, 2019

Related U.S. Application Data

(63) Continuation of application No. PCT/CN2016/104787, filed on Nov. 4, 2016.

(51) Int. Cl.
    *H04L 27/26*     (2006.01)
    *H04L 5/00*      (2006.01)
    *H04W 84/12*     (2009.01)

(52) U.S. Cl.
    CPC ........ *H04L 27/2613* (2013.01); *H04L 5/0007* (2013.01); *H04L 27/26* (2013.01); *H04W 84/12* (2013.01)

(58) Field of Classification Search
    CPC ... H04L 27/2613; H04L 27/26; H04L 5/0007; H04W 84/12
    See application file for complete search history.

(56) References Cited

U.S. PATENT DOCUMENTS

| | | | |
|---|---|---|---|
| 2004/0252777 | A1 | 12/2004 | Suh et al. |
| 2013/0177090 | A1* | 7/2013 | Yang ............... H04L 25/0232 375/260 |

(Continued)

FOREIGN PATENT DOCUMENTS

| | | |
|---|---|---|
| CN | 103718591 A | 4/2014 |
| CN | 103999421 A | 8/2014 |

(Continued)

OTHER PUBLICATIONS

International Search Report dated Jul. 25, 2017 in corresponding International Application No. PCT/CN2016/104787.

(Continued)

*Primary Examiner* — Ayaz R Sheikh
*Assistant Examiner* — Faiyazkhan Ghafoerkhan
(74) *Attorney, Agent, or Firm* — Fish & Richardson P.C.

(57) ABSTRACT

The present application discloses a reference signal configuration method, including: generating a reference signal, where the reference signal includes a first part and a second part, the first part and the second part have a same length, and a sum of a DC component of the first part and a DC component of the second part is zero; generating an enhanced directional multi-gigabit EDMG packet including the reference signal; and sending the EDMG packet. Embodiments of the present application further provide a reference signal configuration apparatus. According to the embodiments of the present application, a reference signal with a zero DC component can be obtained, thereby facilitating channel estimation that is based on CE.

11 Claims, 5 Drawing Sheets

(56) References Cited

U.S. PATENT DOCUMENTS

| | | | |
|---|---|---|---|
| 2014/0051351 A1 | 2/2014 | Jia | |
| 2015/0010105 A1 | 1/2015 | Kim et al. | |
| 2016/0164800 A1 | 6/2016 | Eitan et al. | |
| 2016/0309457 A1 | 10/2016 | Eitan et al. | |
| 2017/0324461 A1* | 11/2017 | Lomayev | H04L 27/2603 |
| 2018/0026695 A1* | 1/2018 | Johnsson | H04B 7/0695 |
| | | | 342/368 |
| 2018/0076979 A1* | 3/2018 | Lomayev | H04L 25/0226 |
| 2018/0115371 A1* | 4/2018 | Trotta | H04B 1/38 |
| 2018/0301804 A1 | 10/2018 | Gao et al. | |
| 2018/0367650 A1* | 12/2018 | Motozuka | H04L 27/2605 |
| 2019/0089440 A1* | 3/2019 | Lomayev | H03M 13/1505 |
| 2019/0190637 A1* | 6/2019 | Lomayev | H04L 23/02 |
| 2020/0014570 A1* | 1/2020 | Lomayev | H04L 27/2601 |

FOREIGN PATENT DOCUMENTS

| | | |
|---|---|---|
| CN | 104584451 A | 4/2015 |
| CN | 105356746 A | 2/2016 |
| WO | 2016094542 A3 | 8/2016 |

OTHER PUBLICATIONS

Yanyan Zhuang, "Research on Joint Estimation of CFO and Transmitter/Receiver I/Q Imbalances in OFDM Systems," Lanzhou University, Oct. 2014, 2 pages (partial English translation).

Office Action issued in Chinese Application No. 201680090531.1 dated Jan. 3, 2020, 13 pages (with English translation).

Assaf Kasher (Intel), "Beamforming Training proposals; 11-16-0103-00-00ay-Beamforming Training proposals", IEEE Draft, IEEE 802.11-16/0103r0, IEEE-SA Mentor, Piscataway, NJ USA, vol. 802.11, XP068104890, Jan. 18, 2016, 15 pages.

IEEE, "IEEE P802.11-REVmc/D7.0", Draft Standard for Information technology—Telecommunications and information exchange between systems Local and metropolitan area networks—Specific requirements, Part 11: Wireless LAN Medium Access Control(MAC) and Physical Layer (PHY) Specifications, XP002797257, Aug. 12, 2016, 16 pages.

Extended European Search Report issued in European Application No. 16920869.1 dated Feb. 14, 2020, 13 pages.

IEEE Std 802.11ad™-2012, "Part 11: Wireless LAN Medium Access Control(MAC) and Physical Layer (PHY) Specifications Amendment 3: Enhancements for Very High Throughput in the 60 GHz Band," IEEE Standard for Information technology—Telecommunications and information exchange between systems; Local and metropolitan area networks—Specific requirements, IEEE Standards Association, Dec. 28, 2012, 628 pages.

IEEE Std 802.11™-2007, "Part 11: Wireless LAN Medium Access Control (MAC) and Physical Layer (PHY) Specifications," IEEE Standard for Information technology—Telecommunications and information exchange between systems—Local and metropolitan area networks—Specific requirements, IEEE Standards Association, Jun. 12, 2007, 1232 pages.

PCT International Search Report and Written Opinion issued in International Application No. PCT/CN2016/104787 dated Jul. 25, 2017, 21 pages (with English translation).

Cordeiro (Intel), "Specification Framework for TGay; IEEE 802.11-15/01358r5," IEEE Draft; IEEE P802.11 Wireless LANs, XP068107003, Aug. 17, 2016, pp. 1-26.

Partial Supplementary European Search Report issued in European Application No. 1690869.1 dated Sep. 18, 2019, 10 pages.

\* cited by examiner

| L-STF | L-CE | L-Header | EDMG-Header-A | EDMG-STF | EDMG-CE | EDMG-Header-B | Data | AGC | TRN |
|---|---|---|---|---|---|---|---|---|---|

FIG. 3

REFERENCE SIGNAL CONFIGURATION METHOD AND APPARATUS AND TRAINING FIELD CONFIGURATION METHOD AND APPARATUS

CROSS-REFERENCE TO RELATED APPLICATIONS

This application is a continuation of International Application No. PCT/CN2016/104787, filed on Nov. 4, 2016, the disclosure of which is hereby incorporated by reference in its entirety.

TECHNICAL FIELD

The present application relates to the field of communications technologies, and in particular, to a reference signal configuration method and apparatus and a training field configuration method and apparatus.

BACKGROUND

IEEE 802.11ad is a first high-frequency standard defined in a wireless local area network (WLAN), and is defined for a millimeter wave frequency band of 60 GHz. In standards for frequency bands below 6 GHz in the WLAN, an orthogonal frequency division multiplexing (OFDM) technology is usually used to improve spectrum efficiency. IEEE 802.11ad defines four physical layer (PHY) transmission modes: a control mode, a single carrier (SC) mode, a low power single carrier (Low Power SC) mode, and an OFDM mode. In the first three modes, physical layer transmission is performed in the single carrier mode.

A directional multi-gigabit (DMG) packet defined in IEEE 802.11ad includes a preamble field, a header field, and a data field. If the packet is used for beam refinement training, a training field is further suffixed to the data field. The preamble field includes a short training field (STF) and a channel estimation (CE) field. The STF is used by a receiver to obtain an appropriate receive gain and perform time synchronization, preliminary carrier frequency offset (CFO) estimation, accurate CFO estimation, channel estimation, and data demodulation. The header filed includes a plurality of fields, used to describe a transmission mode of the data field and indicate information about a length and a type of the training field that is added behind the data filed.

For discussion about enhanced directional multi-gigabit (EDMG) in IEEE 802.11 ay, some new characteristics such as a channel bonding technology and a multiple-input multiple-output (MIMO) technology need to be introduced to enhance IEEE 802.11ad DMG A structure of an EDMG packet includes an L-STF, L-CE, and L-Header, indicating that the EDMG packet is compatible with parts of a DMG packet format. The structure of the EDMG packet may further include EDMG Header, an EDMG STF, and EDMG CE, to assist in demodulation of a data field. L-CE needs to distinguish between the OFDM mode and the SC mode in front of L-Header, and therefore L-CE uses two different sequences Gv and Gu, and uses a design of distinguishing between the OFDM mode and the SC mode based on an order of Gv and Gu. A current EDMG CE design inherits an L-CE design, and still includes the two different sequences Gv and Gu. In addition, CE included in each training unit TRN-Unit in a training suffix in a Beam Refinement Protocol (Beam Refinement Protocol, BRP) packet also inherits the L-CE design, and still includes the two different sequences Gv and Gu to distinguish between the OFDM mode and the SC mode. However, because the OFDM mode and the SC mode have been indicated in EDMG Header in the EDMG packet by using signaling, there is no need to use EDMG CE or the training TRN suffix to distinguish between the OFDM mode and the SC mode. Therefore, EDMG CE and TRN are more flexible in design.

SUMMARY

Embodiments of the present application provide a reference signal configuration method and apparatus and a training field configuration method and apparatus, to obtain a reference signal with a zero direct current (DC) component, thereby facilitating channel estimation that is based on CE.

According to a first aspect, an embodiment of the present application provides a reference signal configuration method, including: first generating a reference signal, where the reference signal includes a first part and a second part, the first part and the second part have a same length, and a sum of a DC component of the first part and a DC component of the second part is zero; then generating an enhanced directional multi-gigabit EDMG packet including the reference signal; and finally sending the EDMG packet. It can be learned that, because a DC of the reference signal is zero, another device may conveniently perform DC offset estimation when receiving the EDMG packet subsequently, thereby facilitating CFO estimation and channel estimation.

In some feasible implementations, a sequence of the first part and a sequence of the second part are in-phase sequences, or a sequence of the first part and a sequence of the second part are reverse-phase sequences.

In some feasible implementations, the reference signal is used as channel estimation CE of the EDMG packet.

In some feasible implementations, the reference signal is used as a training field of the EDMG packet.

In some feasible implementations, a quantity of TRN subfields in each training unit TRN-Unit is greater than 4.

In some feasible implementations, during multi-antenna transmission, an orthogonal sequence or an orthogonal cover code is used to distinguish between reference signals of different antennas.

In some feasible implementations, the reference signal further includes a third part, the third part is used as a prefix or a suffix of the reference signal, a length of the third part is N times the length of the first part or N times the length of the second part, and N is a positive number less than 1.

In some feasible implementations, in a single carrier mode, the sequence of the first part is $Gu512 \times M$, and the sequence of the second part is $-Gu512 \times M$; or the sequence of the first part is $Gv512 \times M$, and the sequence of the second part is $-Gv512 \times M$, where $Gu512 \times M = [-Gb128 \times M, -Ga128 \times M, Gb128 \times M, -Ga128 \times M]$, $Gv512 \times M = [-Gb128 \times M, Ga128 \times M, -Gb128 \times M, -Ga128 \times M]$, M represents a quantity of channels, and M is a positive integer.

In some feasible implementations, in a single carrier mode, both the sequence of the first part and the sequence of the second part are $Gm512 \times M$, $Gm512 \times M = [-Gb128 \times M, -Ga128 \times M, Gb128 \times M, Ga128 \times M]$, M represents a quantity of channels, and M is a positive integer.

In some feasible implementations, in an orthogonal frequency division multiplexing OFDM mode, the sequence of the first part and the sequence of the second part are generated based on a target sequence in frequency domain, and the target sequence does not occupy a DC subcarrier.

In some feasible implementations, two adjacent subcarriers occupied by the target sequence are separated by K×M−1 subcarriers, K is 2 raised to the power of a positive integer, M represents a quantity of channels, and M is a positive integer.

According to a second aspect, an embodiment of the present application provides a training field configuration method, including: first sending configuration information, where the configuration information is used to indicate a quantity of training TRN subfields in an enhanced directional multi-gigabit EDMG packet and a quantity of antenna weight vectors (Antenna Weight Vector, AWV) in the EDMG packet, and at least one TRN subfield uses a same AWV; and then sending a Beam Refinement Protocol BRP packet that is configured based on the configuration information. It can be learned that, because all TRN subfields actually send a same sequence, if one AWV is corresponding to only one TRN subfield, a receive end may not obtain a relatively accurate result through measurement in only one TRN subfield. A transmit apparatus is allowed to perform flexible configuration. This is more helpful in obtaining an accurate measurement result in a plurality of TRN subfields during simultaneous MIMO multi-stream transmission.

In some feasible implementations, the configuration information is configured by using EDMG Header-A.

In some feasible implementations, the configuration information is configured by using a MAC frame.

In some feasible implementations, the configuration information is determined based on a quantity of multiple-input multiple-output MIMO streams that are trained simultaneously.

According to a third aspect, the present application provides a reference signal configuration apparatus, including modules configured to perform the method in the first aspect.

According to a fourth aspect, the present application provides a training field configuration apparatus, including modules configured to perform the method in the second aspect.

According to a fifth aspect, the present application provides a reference signal configuration apparatus. The reference signal configuration apparatus includes a processor, and the processor is configured to support the reference signal configuration apparatus in performing a corresponding function in the reference signal configuration method provided in the first aspect. The reference signal configuration apparatus may further include a memory, and the memory is configured to be coupled to the processor and store a program instruction and data that are necessary for the reference signal configuration apparatus. The reference signal configuration apparatus may further include a communications interface, configured for communication between the reference signal configuration apparatus and another device or a communications network.

According to a sixth aspect, the present application provides a training field configuration apparatus. The training field configuration apparatus includes a processor, and the processor is configured to support the training field configuration apparatus in performing a corresponding function in the training field configuration method provided in the second aspect. The training field configuration apparatus may further include a memory, and the memory is configured to be coupled to the processor and store a program instruction and data that are necessary for the training field configuration apparatus. The training field configuration apparatus may further include a communications interface, configured for communication between the training field configuration apparatus and another device or a communications network.

According to a seventh aspect, the present application provides a computer storage medium, configured to store a computer software instruction used by the reference signal configuration apparatus provided in the fifth aspect. The computer software instruction includes a program designed for implementing the foregoing aspect.

According to an eighth aspect, the present application provides a computer storage medium, configured to store a computer software instruction used by the training field configuration apparatus provided in the sixth aspect. The computer software instruction includes a program designed for implementing the foregoing aspect.

These aspects or other aspects of the present application are more concise and understandable in the description of the following embodiments.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

FIG. 3 is a schematic diagram of a possible format of an EDMG packet according to an embodiment of the present application;

DESCRIPTION OF EMBODIMENTS

Figure 1:
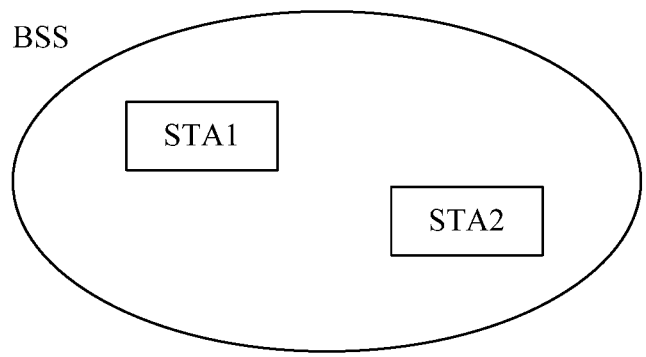
FIG. 1 is a schematic diagram of a communications system according to an embodiment of the present application.

To make persons skilled in the art understand the technical solutions in the present application better, the following clearly describes the technical solutions in the embodiments of the present application with reference to the accompanying drawings in the embodiments of the present application. Apparently, the described embodiments are merely some rather than all of the embodiments of the present application. All other embodiments obtained by persons of ordinary skill in the art based on the embodiments of the present application without creative efforts shall fall within the protection scope of the present application.

Details are separately described below.

In the specification, claims, and accompanying drawings of the present application, the terms "first", "second", "third", "fourth", and the like are intended to distinguish between different objects, but do not indicate a particular order. Moreover, the terms "include", "has", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

"Embodiment" mentioned in this specification means that a particular feature, structure, or characteristic that is described with reference to the embodiment may be included in at least one embodiment of the present application. The word appearing at different locations in this specification does not necessarily mean a same embodiment, or an independent or alternate embodiment exclusive of another embodiment.

Persons skilled in the art can explicitly and implicitly understand that the embodiments described in this specification may be combined with other embodiments.

The following explains some terms in this application, to facilitate understanding of persons skilled in the art.

(1) A transmit apparatus and a receive apparatus may be stations (Station, STA), or may be access points (Access Point, AP) or personal basic service set control points (PBSS Control Point, PCP). The STA is each terminal connected to a wireless network, for example, a handheld device with a wireless connection function, or an in-vehicle device. Common terminals include, for example, a mobile phone, a tablet computer, a notebook computer, a palmtop computer, a mobile Internet device (Mobile Internet Device, MID), and a wearable device such as a smartwatch, a smart band, or a pedometer. The AP is usually translated as "wireless access node" or "bridge". The AP mainly serves as a bridge between a wireless workstation and a wired local area network at a Media Access Control MAC layer.

(2) An enhanced directional multi-gigabit (Enhanced Directional Multi-Gigabit, EDMG) packet represents a packet format defined in the IEEE 802.11 ay protocol used for a millimeter wave frequency band of 60 GHz.

(3) An antenna weight vector (Antenna Weight Vector, AWV) represents a weight vector and describes an amplitude and a phase of an antenna array element.

(4) A Beam Refinement Protocol (Beam Refinement Protocol, BRP) packet is an EDMG packet or a DMG packet in which a training field is further suffixed to a data field.

(5) "A plurality of" means "two or more". The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes the embodiments of this application with reference to the accompanying drawings.

FIG. 1 is a schematic diagram of a communications system disclosed in an embodiment of the present application. The communications system shown in FIG. 1 includes a basic service set (Basic Service Set, BSS), and network nodes in the basic service set include an AP and a STA. In IEEE 802.11ad, a personal basic service set (Personal Basic Service Set, PBSS) and a personal basic service set control point (PBSS Control Point, PCP) are introduced based on the original BSS. Each personal basic service set may include one AP/PCP and a plurality of non PCP-STAs associated with the AP/PCP. In this embodiment of this application, the non PCP STA is briefly referred to as STA.

A transmit apparatus and a receive apparatus may be STAs or APs/PCPs. The transmit apparatus first generates a reference signal, where the reference signal includes a first part and a second part, the first part and the second part have a same length, and a sum of a DC component of the first part and a DC component of the second part is zero; then generates an enhanced directional multi-gigabit EDMG packet including the reference signal; and finally sends the EDMG packet. Subsequently, when receiving the EDMG packet, the receive apparatus performs DC offset estimation, CFO estimation, or channel estimation based on the reference signal in the EDMG packet. Because a DC of the reference signal itself is zero, the receive apparatus may conveniently perform DC offset estimation, thereby facilitating CFO estimation and channel estimation.

Figure 2:
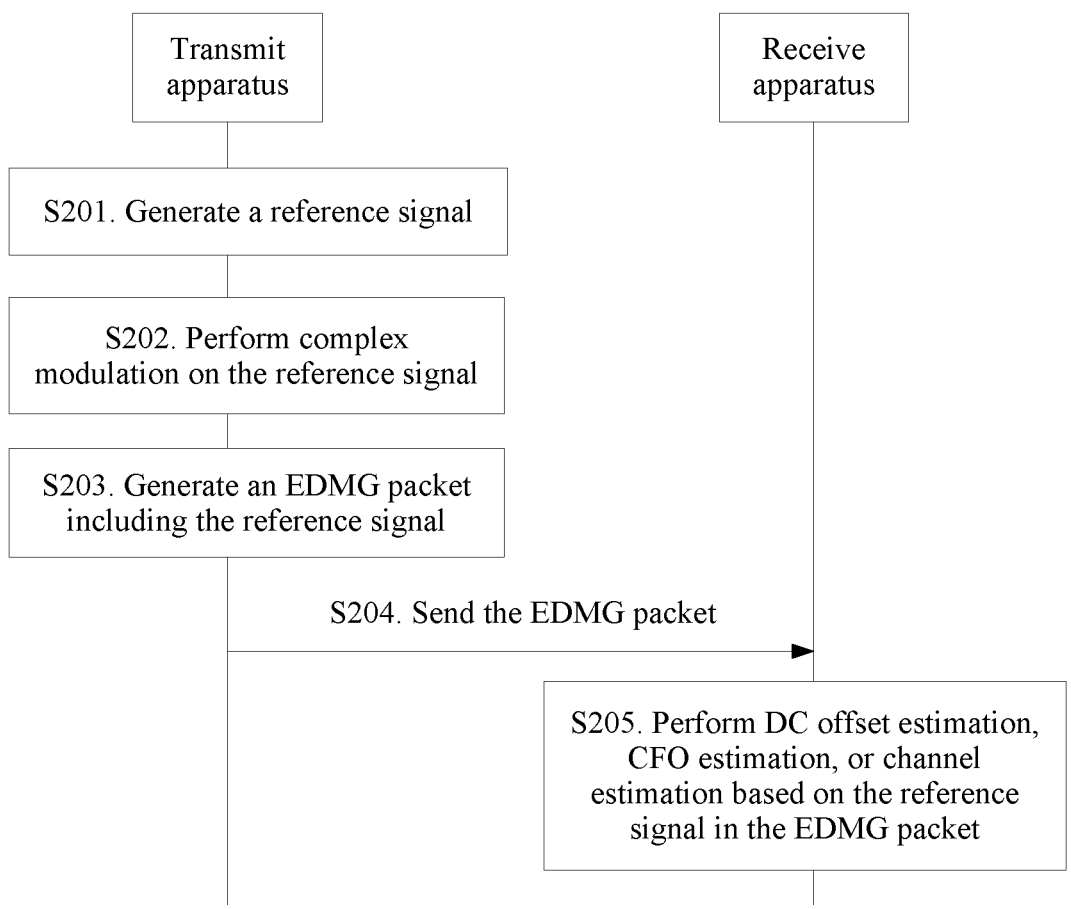
FIG. 2 is a schematic flowchart of a reference signal configuration method according to an embodiment of the present application.

FIG. 2 is a schematic flowchart of a reference signal configuration method according to an embodiment of the present application. A transmit apparatus and a receive apparatus are included. The transmit apparatus is the reference signal configuration apparatus in the embodiments of the present application. The following steps are included.

S201. The transmit apparatus generates a reference signal, where the reference signal includes a first part and a second part, the first part and the second part have a same length, and a sum of a DC component of the first part and a DC component of the second part is zero.

S202. The transmit apparatus performs complex modulation, where a modulation scheme is preferably π/2 BPSK modulation.

S203. The transmit apparatus generates an enhanced directional multi-gigabit EDMG packet including the reference signal.

S204. The transmit apparatus sends the EDMG packet.

S205. The receive apparatus receives the EDMG packet, and performs DC offset estimation, CFO estimation, or channel estimation based on the reference signal included in the EDMG packet.

Optionally, a sequence of the first part and a sequence of the second part are in-phase sequences, or a sequence of the first part and a sequence of the second part are reverse-phase sequences.

Optionally, the reference signal further includes a third part, the third part is used as a prefix or a suffix of the reference signal, a length of the third part is N times the length of the first part or N times the length of the second part, and N is a positive number less than 1. When the third part is the prefix of the reference signal, the third part is a cyclic prefix of the first part. When the third part is the suffix of the reference signal, the third part is a cyclic suffix of the second part. The length of the third part is N times the length of the first part or N times the length of the second part. For example, the length of the third part is the same as a length of a prefix or a suffix of L-CE in an existing DMG packet, and is ¼ of the length of the first part or the second part. Certainly, the length of the third part may be other multiples, such as ½, of the length of the first part or the second part. This is not limited in the present application.

FIG. 3 is a schematic diagram of a possible format of the EDMG packet according to this embodiment of the present application. Optionally, the reference signal is used as channel estimation CE of the EDMG packet and/or used as a training field of the EDMG packet. To be specific, the reference signal is used as EDMG-CE shown in FIG. 3 and/or used as CE and/or a TRN subfield in a TRN field shown in FIG. 3.

Figure 4:
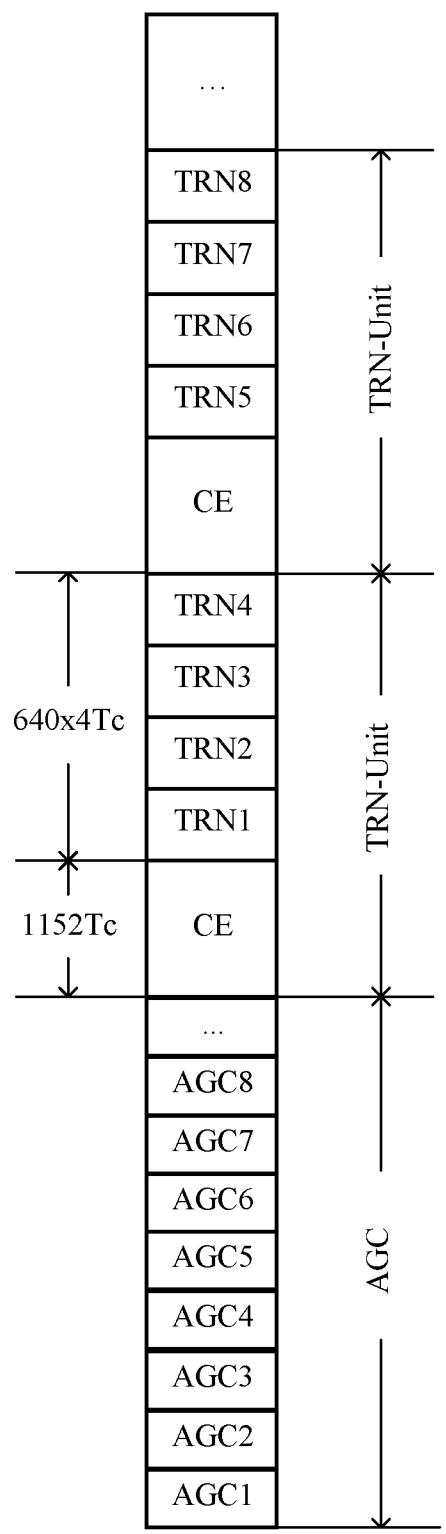
FIG. 4 is a schematic structural diagram of a training TRN field according to an embodiment of the present application.

FIG. 4 is a schematic structural diagram of a training TRN field according to an embodiment of the present application.

The training TRN field includes two parts: AGC and a training TRN unit. AGC is an AGC field used by a receive device to obtain an appropriate receive gain, and includes 4N AGC subfields (in other words, a quantity of AGC subfields is an integral multiple of 4). The TRN field includes N training units (TRN-Unit), and each TRN-Unit includes one CE and four TRN subfields (TRN subfield). Optionally, there are T×N AGC subfields (in other words, a quantity of AGC subfields is an integral multiple of T). The TRN field includes N training units (TRN-Unit), and each TRN-Unit includes one CE and T TRN subfields (TRN subfield). A quantity T of TRN subfields in each training unit TRN-Unit is greater than 4. In other words, a quantity of TRN subfields in each TRN-Unit shown in FIG. 4 may be not less than 4.

Optionally, in a single carrier mode, the sequence of the first part is Gu512×M, and the sequence of the second part is −Gu512×M; or the sequence of the first part is Gv512×M, and the sequence of the second part is −Gv512×M, where Gu512×M=[−Gb128×M, −Ga128×M, Gb128×M, −Ga128×M], Gv512×M=[−Gb128×M, Ga128×M, −Gb128×M, −Ga128×M], M represents a quantity of channels, and M is a positive integer. Ga and Gb represent a pair of Golay complementary sequences, and Gv or Gu is a sequence including Ga and Gb. For example, during single-channel transmission, M=1, and Ga128 and Gb128 represent a pair of Golay complementary sequences each with a length of 128. In this case, Gu512=[−Gb128, −Ga128, Gb128, −Ga128], and Gv512=[−Gb128, Ga128, −Gb128, −Ga128]. During three-channel bonding transmission, M=3, and Ga384 and Gb384 represent a pair of Golay complementary sequences each with a length of 384. In this case, Gu1536= [−Gb384, −Ga384, Gb384, −Ga384], and Gv1536=[−Gb384, Ga384, −Gb384, −Ga384].

Optionally, in a single carrier mode, both the sequence of the first part and the sequence of the second part are Gm512×M, Gm512×M=[−Gb128×M, −Ga128×M, Gb128×M, Ga128×M], M represents a quantity of channels, and M is a positive integer. Ga and Gb represent a pair of Golay complementary sequences, and Gm is a sequence including Ga and Gb. A sequence length increases with the quantity M of channels.

For example, during single channel transmission, a reference sequence is [Gu512, −Gu512, −Gv128] whose first part and second part are reverse-phase sequences. The first part is Gu512=[−Gb128, −Ga128, Gb128, −Ga128], the second part is −Gu512, the third part is a suffix Gv128=[−Gb128], and a first sub-sequence in the second part −Gu512 is the same as the suffix Gv128. Because Gu512+(−Gu512) =0, a signal DC component is zero in the first part and the second part. Alternatively, a reference sequence is [Gv512, −Gv512, −Gv128] whose first part and second part are in-phase sequences. The first part is Gv512=[−Gb128, Ga128, −Gb128, −Ga128], the second part is −Gv512, Gv128=[−Gb128], and the first sub-sequence in −Gv512 is the same as Gv128. Because Gv512+(−Gv512)=0, a signal DC component is zero.

For another example, in a two-channel bonding case, the reference signal is [Gu1024, −Gu1024, −Gv256] or [Gv1024, −Gv1024, −Gv256], where Gu1024=[−Gb256, −Ga256, Gb256, −Ga256], Gv1024=[−Gb256, Ga256, −Gb256, −Ga256], and Gv256=[−Gb256]. Ga256 and Gb256 represent a pair of Golay complementary sequences each with a length of 256. In a four-channel bonding case, the reference signal is [Gu2048, −Gu2048, −Gv512] or [Gv2048, −Gv2048, −Gv512], where Gu2048=[−Gb512, −Ga512, Gb512, −Ga512], Gv2048=[−Gb512, Ga512, −Gb512, −Ga512], and Gv512=[−Gb512]. Ga512 and Gb512 represent a pair of Golay complementary sequences each with a length of 512. For another example, in a MIMO case, each transmit antenna uses orthogonal cover code spread and/or orthogonal sequence spread.

For example, two antennas use the orthogonal sequence spread. For an antenna 1, CE1=[Gu1, −Gu1, Gb], and for an antenna 2, CE2=[Gu2, −Gu2, Gd]. Gu1 and Gu2 are orthogonal sequences, Gv1 and Gv2 are orthogonal sequences, Gu1 and Gv1 are sequences including Ga and Gb, and Gu2 and Gv2 are sequences including Gc and Gd. Ga and Gc are mutual orthogonal sequences, and Gb and Gd are mutual orthogonal sequences.

For another example, two antennas use the orthogonal cover code spread. When the two transmit antennas use [1, 1] and [1, −1], assuming that a reference signal transmitted by using a single antenna is CE1, an antenna 1 sends [CE1, CE1], and an antenna 2 sends [CE1, −CE1]. For example, four antennas use a combination of the orthogonal cover code spread and the orthogonal sequence spread. An antenna 1 sends [CE1, CE1], an antenna 2 sends [CE2, CE2], an antenna 3 sends [CE3, −CE3], and an antenna 4 sends [CE4, −CE4]. CE1 and CE2 include orthogonal sequences or other sequences having zero correlation zones (ZCZ, Zero Cross Zone), and the CE3 and CE4 include an orthogonal sequence of the first part and an orthogonal sequence of the second part or include other sequences having zero correlation zones (ZCZ, Zero Cross Zone). CE1, CE3, CE2, and CE4 constitute other sequences having zero correlation zones. A pair of the antenna 1 and the antenna 2 and a pair of the antenna 3 and the antenna 4 use different orthogonal cover codes.

Optionally, during multi-antenna transmission, an orthogonal sequence or an orthogonal cover code is used to distinguish between reference signals of different antennas.

Optionally, in an orthogonal frequency division multiplexing OFDM mode, the sequence of the first part and the sequence of the second part are generated based on a target sequence in frequency domain, and the target sequence does not occupy a DC subcarrier.

To enable a time-domain peak-to-average ratio to be relatively small and reduce an error caused by a power amplifier non-linearly, a constant envelope sequence or a sequence with a relatively small peak-to-average ratio is usually selected as the target sequence.

For example, during single channel transmission, a size of Fast Fourier Transform (Fast Fourier Transform, FFT) of one OFDM symbol is 512. There are 355 subcarriers on an effective bandwidth, and a carrier #0 is a DC subcarrier. The target sequence does not occupy the DC subcarrier. In other words, the target sequence is zero on the carrier #0. A modulated target sequence occupies 354 subcarriers of the 355 subcarriers on the effective bandwidth, and is transformed to time domain through IFFT (Inverse Fast Fourier Transform, IFFT).

Optionally, first 256 sampling points are the first part, and last 256 sampling points are the second part. Because the target sequence does not occupy the DC subcarrier, a sum of signal DC components of the first part and the second part is zero. In addition, because phase noise is relatively large in a high frequency, subcarriers near the subcarrier #0 are also set to zero. Subcarriers in front of and behind the subcarrier #0 are also set to zero. To be specific, a modulated target sequence occupies 355-3 subcarriers of the 355 subcarriers on the effective bandwidth, and is transformed to time domain through IFFT.

Optionally, a plurality of OFDM symbols whose DC components are zero constitute the reference signal. For example, the first part is a modulated target sequence that occupies 354 subcarriers of the 355 subcarriers on the effective bandwidth and that is transformed to time domain through IFFT (Inverse Fast Fourier Transform, IFFT). The sequence of the first part and the sequence of the second part are in-phase sequences, or the sequence of the first part and the sequence of the second part are reverse-phase sequences.

During multi-channel transmission, a quantity of FFT/IFFT points increases with the quantity of channels, and increases to 512×M. The effective bandwidth also extends with the quantity of channels. However, because guard space between channels can also be used, a quantity of subcarriers on the effective bandwidth is greater than 355×M. A specific quantity is not limited in the present application.

Similar to single carrier transmission, during multi-antenna transmission, an orthogonal sequence or an orthogonal cover code may be used to distinguish between different antennas.

Further, two adjacent subcarriers occupied by the target sequence are separated by K×M−1 subcarriers, K is 2 raised to the power of a positive integer, M represents a quantity of channels, and M is a positive integer.

For example, in a case of a single channel, M=1. When K is equal to $2^0$, it indicates that every two subcarriers occupied by the target sequence are separated by 1−1 subcarriers, in other words, there is no spacing between every two subcarriers occupied by the target sequence (this is the same as the foregoing embodiment). When K is equal to 2, it indicates that every two subcarriers occupied by the target sequence are separated by 2−1 subcarrier, in other words, the target sequence is inserted at an interval of one subcarrier on the effective bandwidth, and the target sequences are zero on other subcarriers.

Receive Apparatus:

DC offset estimation is as follows: finding a start point of the reference signal, performing an operation based on the first part and the second part of the received reference signal to obtain a DC offset (DC Offset), and taking an average of a weighted sum of the first part and the second part of the received reference signal if the sequence of the first part and the sequence of the second part are in-phase sequences, or taking an average of a weighted sum obtained by subtracting the second part from the first part if the sequence of the first part and the sequence of the second part are reverse-phase sequences. In addition, for a specific weighing method, refer to the prior art. Details are not described herein.

A CFO estimation method is as follows: finding a start point of the reference signal, and performing an operation based on the first part and the second part of the reference signal to obtain a CFO. Details are as follows: Step 1: Subtract a DC offset from the signal. Step 2: Demodulate the received reference signal. For example, the transmit end uses π/2 BPSK, and the receive end performs demodulation to obtain an original sequence r(n), where a value range of n is related to a mode. It is assumed that in a single-antenna single-channel mode, a value range of n is 1 to 1024 (excluding a length 128 of the third part). In a single-antenna two-channel-bonding case, a value range of n is 1 to 1024×2. In a single-antenna four-channel-bonding case, a value range of n is 1 to 1024×4. In a single-channel two-antenna case, if orthogonal code spread is used, a value range of n is 1 to 1024; or if orthogonal cover code spread is used, a value range of n is 1 to 1024×2. In a single-channel four-antenna case, if orthogonal code spread and orthogonal cover code spread are used, a value range of n is 1 to 1024×2. Step 3: Perform a correlation operation by using the first part and the second part. For example, point multiplication is performed on the received first part and a conjugate b1 of the received second part, an angle b2 of b1 is calculated, b2 is multiplied by a sampling rate, and a product of b2 and the sampling rate is divided by 2×π×length(r1), where length(r1) represents a quantity of sampling points in the first part, and $$CFO=angle(r1.*conj(r2))*sample\_rate/(2*\pi*length(r1))$$

A channel estimation method is as follows: Step 1: Find a start point of the reference signal, and compensate for a DC offset. Step 2: Estimate a CFO, and compensate the received signal for the estimated CFO, to be specific, perform point multiplication on exp(−j×2×π×CFO×(0:(length(r1)−1))/sample_rate) and the received reference signal. Step 3: Obtain a multipath correlation peak based on correlation between a compensated sequence and a local sequence, where the multipath correlation peak is used for time-domain channel estimation, or is used for frequency-domain channel estimation by being transformed to frequency domain through FFT.

It can be learned that in this embodiment of the present application, the transmit apparatus first generates the reference signal, where the reference signal includes the first part and the second part, the first part and the second part have a same length, a sum of the signal DC component of the first part and the signal DC component of the second part is zero, and the sequence of the first part and the sequence of the second part are in-phase sequences or the sequence of the first part and the sequence of the second part are reverse-phase sequences; then generates the enhanced directional multi-gigabit EDMG packet including the reference signal; and finally sends the EDMG packet. Subsequently, when receiving the EDMG packet, the receive apparatus performs DC offset estimation, CFO estimation, or channel estimation based on the reference signal in the EDMG packet. Because a DC of the reference signal itself is zero, the receive apparatus may conveniently perform DC offset estimation, thereby facilitating CFO estimation and channel estimation.

Figure 5:
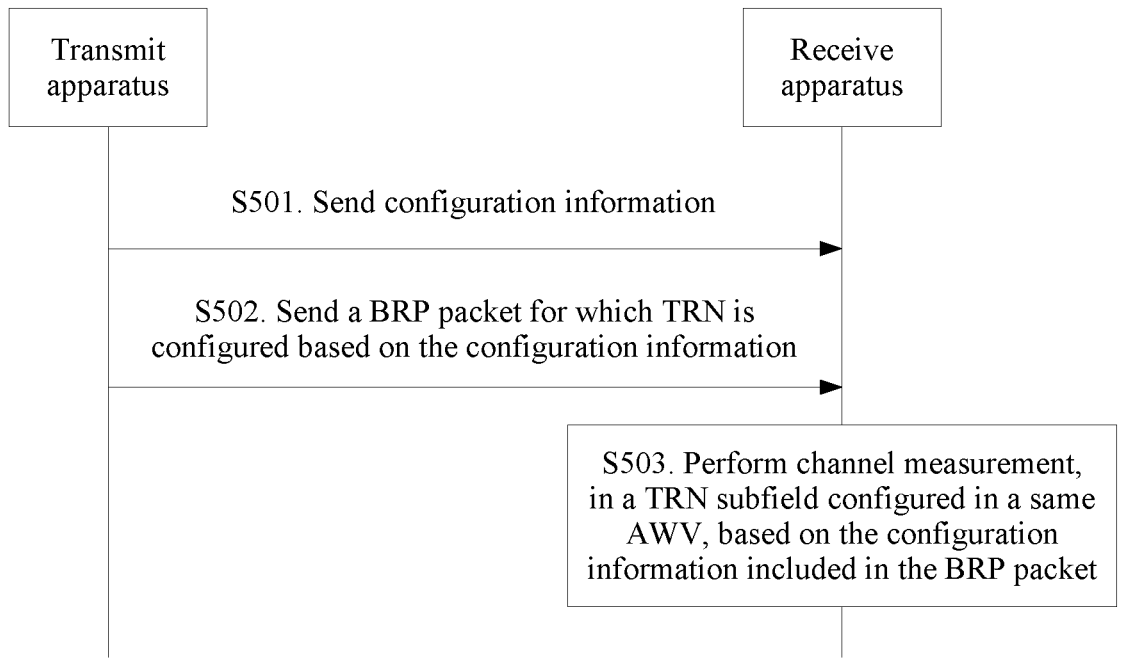
FIG. 5 is a schematic flowchart of a training field configuration method according to an embodiment of the present application.

FIG. 5 is a schematic flowchart of a training field configuration method according to an embodiment of the present application. A transmit apparatus and a receive apparatus are included. The transmit apparatus is the training field configuration apparatus in the embodiments of the present application. The following steps are included.

S501. The transmit apparatus sends configuration information, where the configuration information is used to indicate a quantity of training TRN subfields in an enhanced directional multi-gigabit EDMG packet and a quantity of antenna weight vectors AWVs in the EDMG packet, and at least one TRN subfield uses a same AWV.

S502. The transmit apparatus sends a Beam Refinement Protocol BRP packet for which TRN is configured based on the configuration information.

Optionally, a reference signal in the BRP packet is transmitted in a DMG packet-compatible manner.

Optionally, the BRP packet includes the reference signal. The reference signal includes a first part and a second part, the first part and the second part have a same length, and a sum of a DC component of the first part and a DC component of the second part is zero.

Optionally, the configuration information may be in EDMG Header-A of the BRP packet; or may be indicated in a data field of the BRP packet by using MAC-layer signaling; or may be indicated in front of the BRP packet by using MAC-layer signaling carried in a data field of a BRP frame;

or may be jointly indicated by using MAC signaling carried in a data field of a BRP frame and EDMG Header-A of the BRP packet. This is not limited in the present application.

S503. The receive apparatus receives the BRP packet, and performs, in a TRN subfield configured in a same AWV, channel measurement based on the configuration information included in the BRP packet.

Optionally, the configuration information is configured by using EDMG Header-A.

Optionally, the configuration information is configured by using a MAC frame.

Optionally, the configuration information is determined based on a quantity of multiple-input multiple-output MIMO streams that are trained simultaneously.

For example, a physical layer configuration method in a WLAN is used. Specifically, the configuration information is indicated by using EDMG Header-A. Because the quantity of TRN subfields may have been indicated in DMG Header, and is four times a length indicated by a training length field, EDMG Header-A may be further used to indicate a quantity of TRN subfields that can be used to measure one AWV. For example, 2 bits may be used for representation and may represent four modes: 1, 2, 4, and 8. The configuration information may be alternatively configured by using MAC. For example, the configuration information may be configured by using some signaling in a BRP establishment stage, for example, by using a DMG Beam Refinement element. For example, 2 bits may be used for representation and may represent four modes: 1, 2, 4, and 8. The configuration information may be alternatively carried by using other signaling. Certainly, the configuration information may be indicated by using a hybrid of MAC and PHY. For example, the configuration information is configured by using MAC and is activated at a physical layer. A quantity of TRN subfields that can be used to measure one AWV is configured at a higher layer. For example, two modes: 1 and 8 are configured at the higher layer. At the physical layer, 1 bit in an EDMG Header-A field is used to indicate whether a current packet uses 1 or 8. The configuration information may alternatively be bound in advance to a quantity of MIMO streams. For example, if TRN uses a spreading code to perform MIMO spreading, when EDMG Header-A is used to indicate that one MIMO stream is transmitted, it indicates that each TRN may be corresponding to measurement of one AWV; when two MIMO streams are transmitted, it indicates that every two TRN subfields may be corresponding to measurement of one AWV; when three or four MIMO streams are transmitted, it indicates that every four TRN subfields may be corresponding to measurement of one AWV; when five to eight MIMO streams are transmitted, it indicates that every eight TRN subfields may be corresponding to measurement of one AWV. For example, if TRN uses an orthogonal sequence and a spreading code to perform MIMO spreading, when EDMG Header-A is used to indicate that one or two MIMO streams are transmitted, it indicates that each TRN may be corresponding to measurement of one AWV; when three or four MIMO streams are transmitted, it indicates that every two TRN subfields may be corresponding to measurement of one AWV; or when three to eight MIMO streams are transmitted, it indicates that every four TRN subfields may be corresponding to measurement of one AWV.

It can be learned that, in this embodiment of the present application, because all TRN subfields actually send a same sequence, if one AWV is corresponding to only one TRN subfield, a receive end may not obtain a relatively accurate result through measurement in only one TRN subfield. The transmit apparatus is allowed to perform flexible configuration. This is more helpful in obtaining an accurate measurement result in a plurality of TRN subfields during simultaneous MIMO multi-stream transmission.

In addition, the training field configuration method in this embodiment of the present application may be used for configuration of the training field of the EDMG packet in the reference signal configuration method in this embodiment of the present application.

Figure 6:
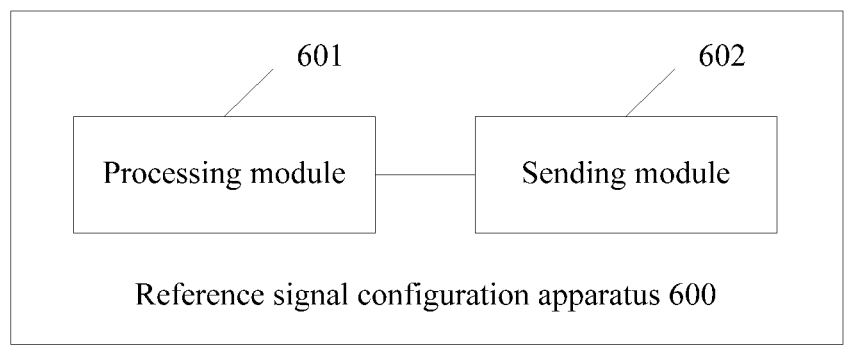
FIG. 6 is a schematic structural diagram of a reference signal configuration apparatus according to an embodiment of the present application.

An embodiment of the present application further provides a reference signal configuration apparatus 600. As shown in FIG. 6, the apparatus 600 includes:

a processing module 601, configured to generate a reference signal, where the reference signal includes a first part and a second part, the first part and the second part have a same length, and a sum of a DC component of the first part and a DC component of the second part is zero, where the processing module 601 is further configured to generate an enhanced directional multi-gigabit EDMG packet including the reference signal; and a sending module 602, configured to send the EDMG packet.

Optionally, a sequence of the first part and a sequence of the second part are in-phase sequences, or a sequence of the first part and a sequence of the second part are reverse-phase sequences.

Optionally, the reference signal is used as channel estimation CE of the EDMG packet.

Optionally, the reference signal is used as CE in a training field of the EDMG packet.

Optionally, a quantity of TRN subfields in each training unit TRN-Unit is greater than 4.

Optionally, during multi-antenna transmission, an orthogonal sequence or an orthogonal cover code is used to distinguish between reference signals of different antennas.

Optionally, the reference signal further includes a third part, the third part is used as a prefix or a suffix of the reference signal, a length of the third part is N times the length of the first part or N times the length of the second part, and N is a positive number less than 1.

Optionally, in a single carrier mode, the sequence of the first part is $Gu512 \times M$, and the sequence of the second part is $-Gu512 \times M$; or the sequence of the first part is $Gv512 \times M$, and the sequence of the second part is $-Gv512 \times M$, where $Gu512 \times M=[-Gb128 \times M, -Ga128 \times M, Gb128 \times M, -Ga128 \times M]$, $Gv512 \times M=[-Gb128 \times M, Ga128 \times M, -Gb128 \times M, -Ga128 \times M]$, M represents a quantity of channels, and M is a positive integer.

Optionally, in a single carrier mode, both the sequence of the first part and the sequence of the second part are $Gm512 \times M$, $Gm512 \times M=[-Gb128 \times M, -Ga128 \times M, Gb128 \times M, Ga128 \times M]$, M represents a quantity of channels, and M is a positive integer.

Optionally, in an orthogonal frequency division multiplexing OFDM mode, the sequence of the first part and the sequence of the second part are generated based on a target sequence in frequency domain, and the target sequence does not occupy a DC subcarrier.

Optionally, two adjacent subcarriers occupied by the target sequence are separated by $K \times M-1$ subcarriers, K is 2 raised to the power of a positive integer, M represents a quantity of channels, and M is a positive integer.

It should be noted that the foregoing modules (the processing module 601 and the sending module 602) are configured to perform related steps in the foregoing method. For example, the processing module 601 is configured to perform step S201 and step S203, and the sending module 602 is configured to perform step S204.

In this embodiment, the reference signal configuration apparatus 600 is presented in a form of modules. The "modules" herein may be an application-specific integrated circuit (application-specific integrated circuit, ASIC), a processor that executes one or more software or firmware programs and a memory, an integrated logic circuit, and/or other components that can provide the foregoing functions. In addition, the processing module 601 may be implemented by using a processor 801 of a computer device 800 shown in FIG. 8. The sending module 602 may be implemented by using a communications interface 803 of the computer device 800 shown in FIG. 8.

An embodiment of the present application further provides a training field configuration apparatus 700. As shown in FIG. 6, the apparatus 700 includes:

a processing module 701, configured to generate configuration information, where the configuration information is used to indicate a quantity of training TRN subfields in an enhanced directional multi-gigabit EDMG packet and a quantity of antenna weight vectors AWVs in the EDMG packet, and at least one TRN subfield uses a same AWV; and a sending module 702, configured to send the configuration information.

The sending module 702 is further configured to send a Beam Refinement Protocol BRP packet that is configured by the processing module based on the configuration information.

Optionally, the configuration information is configured by using EDMG Header-A.

Optionally, the configuration information is configured by using a MAC frame.

Optionally, the configuration information is determined based on a quantity of multiple-input multiple-output MIMO streams that are trained simultaneously.

It should be noted that the foregoing modules (the processing module 701 and the sending module 702) are configured to perform related steps in the foregoing method. For example, the sending module 702 is configured to perform step S501 and step S502.

In this embodiment, the training field configuration apparatus 700 is presented in a form of modules. The "modules" herein may be an application-specific integrated circuit (application-specific integrated circuit, ASIC), a processor that executes one or more software or firmware programs and a memory, an integrated logic circuit, and/or other components that can provide the foregoing functions. In addition, the processing module 701 may be implemented by using a processor 801 of a computer device 800 shown in FIG. 8. The sending module 702 may be implemented by using a communications interface 803 of the computer device 800 shown in FIG. 8.

Figure 7:
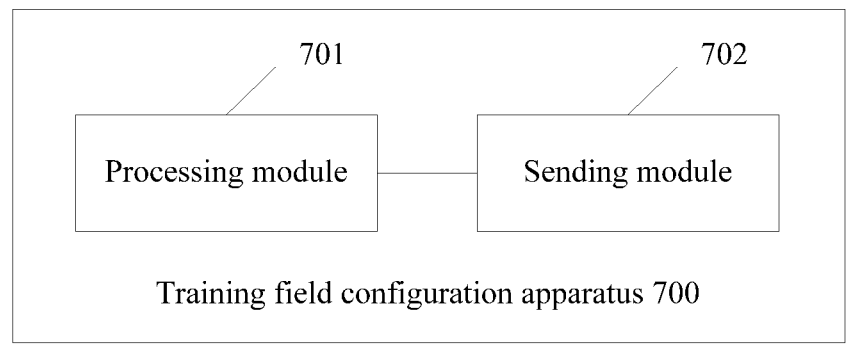
FIG. 7 is a schematic structural diagram of a training field configuration apparatus according to an embodiment of the present application.
Figure 8:
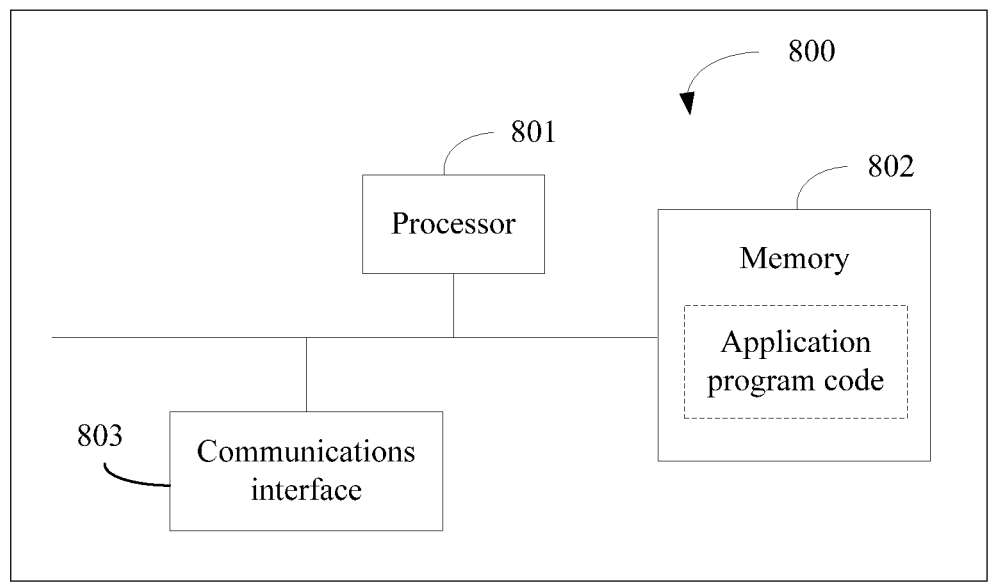
FIG. 8 is a schematic structural diagram of a computer device according to an embodiment of the present application.

As shown in FIG. 8, the reference signal configuration apparatus shown in FIG. 6 and the training field configuration apparatus shown in FIG. 7 may be implemented by using a structure of the computer device 800 shown in FIG. 8. The computer device 800 includes at least one processor 801, at least one memory 802, and at least one communications interface 803. The processor 801, the memory 802, and the communications interface 803 are connected and communicate with each other by using a communications bus.

The processor 801 may be a general-purpose central processing unit (CPU), a microprocessor, an application-specific integrated circuit (application-specific integrated circuit, ASIC), or one or more integrated circuits for controlling execution of the foregoing solution program.

The communications interface 803 is configured to communicate with another device or a communications network, such as the Ethernet, a radio access network (RAN), or a wireless local area network (Wireless Local Area Network, WLAN).

The memory 802 may be a read-only memory (read-only memory, ROM) or another type of static storage device capable of storing static information and instructions, or a random access memory (random access memory, RAM) or another type of dynamic storage device capable of storing information and instructions; or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compressed optical disc, a laser disc, an optical disc, a digital universal optical disc, a Blu-ray optical disc, and the like), a magnetic disk storage medium or another magnetic storage device, or any other medium capable of carrying or storing expected program code in a form of instructions or data structures and capable of being accessed by a computer. However, the memory 802 is not limited thereto. The memory may exist independently, and is connected to the processor by using the bus. The memory may alternatively be integrated with the processor.

The memory 802 is configured to store application program code for executing the foregoing solutions, and the processor 801 controls the execution. The processor 801 is configured to execute the application program code stored in the memory 802.

Assuming that the computer device shown in FIG. 8 is a reference signal configuration apparatus, the code stored in the memory 802 can be used to perform the foregoing provided reference signal configuration method performed by a terminal device, for example, generate a reference signal, where the reference signal includes a first part and a second part, the first part and the second part has a same length, a sum of a DC component of the first part and a DC component of the second part is zero, and a sequence of the first part and a sequence of the second part are in-phase sequences or a sequence of the first part and a sequence of the second part are reverse-phase sequences; generate an enhanced directional multi-gigabit EDMG packet including the reference signal; and send the EDMG packet.

Assuming that the computer device shown in FIG. 8 is a training field configuration apparatus, the code stored in the memory 802 can be used to perform the foregoing provided training field configuration method performed by a terminal device, for example, send configuration information, where the configuration information is used to indicate a quantity of training TRN subfields in an enhanced directional multi-gigabit EDMG packet and a quantity of antenna weight vectors AWVs in the EDMG packet, and at least one TRN subfield uses a same AWV; and send a Beam Refinement Protocol BRP packet that is configured based on the configuration information.

An embodiment of the present application further provides a computer storage medium. The computer storage medium may store a program, and when the program is executed, some or all of the steps of any reference signal configuration method recorded in the foregoing method embodiments are performed.

An embodiment of the present application further provides a computer storage medium. The computer storage medium may store a program, and when the program is executed, some or all of the steps of any training field configuration method recorded in the foregoing method embodiments are performed.

It should be noted that, to make the description brief, the foregoing method embodiments are expressed as a series of actions. However, persons skilled in the art should appreciate that the present application is not limited to the described action sequence, because according to the present application, some steps may be performed in other sequences or performed simultaneously. In addition, persons skilled in the art should also appreciate that all the embodiments described in this specification are example embodiments, and the related actions and modules are not necessarily mandatory to the present application.

In the foregoing embodiments, the descriptions of the embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, to be specific, may be located in one place, or may be distributed on a plurality of network units. Some or all of the units may be selected based on actual needs to achieve the objectives of the solutions of the embodiments.

In addition, the functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable memory. Based on such an understanding, the technical solutions of the present application essentially, or the part contributing to the prior art, or all or some of the technical solutions may be implemented in a form of a software product. The computer software product is stored in a memory and includes several instructions for instructing a computer device (which may be a personal computer, a server, a network device, or the like) to perform all or some of the steps of the methods described in the embodiments of the present application. The foregoing memory includes any medium that can store program code, such as a USB flash drive, a read-only memory (ROM, Read-Only Memory), a random access memory (RAM, Random Access Memory), a removable hard disk, a magnetic disk, or an optical disc.

Persons of ordinary skill in the art may understand that all or some of the steps of the various methods in the embodiments may be implemented by a program instructing related hardware. The program may be stored in a computer readable memory. The memory may include a flash memory disk, a read-only memory (English: Read-Only Memory, ROM for short), a random access memory (English: Random Access Memory, RAM for short), a magnetic disk, or an optical disk.

The embodiments of the present application are described in detail above. The principle and implementations of the present application are described in this specification by using specific examples. The foregoing descriptions of the embodiments are merely used to help understand the methods and core ideas of the present application. In addition, persons of ordinary skill in the art can make variations to the present application in terms of the specific implementations and application scopes according to the ideas of the present application. Therefore, the content of this specification shall not be construed as a limit to the present application.

What is claimed is:

1. A reference signal configuration method, comprising:
generating a reference signal, wherein the reference signal comprises a first part and a second part, the first part and the second part have a same length, and a sum of a DC component of the first part and a DC component of the second part is zero, and wherein in an orthogonal frequency division multiplexing (OFDM) mode, a sequence of the first part and a sequence of the second part are generated based on a target sequence in frequency domain, and the target sequence does not occupy a DC subcarrier;
generating an enhanced directional multi-gigabit (EDMG) packet comprising the reference signal; and
sending the EDMG packet.

2. The method according to claim 1, wherein a sequence of the first part and a sequence of the second part are in-phase sequences, or a sequence of the first part and a sequence of the second part are reverse-phase sequences.

3. The method according to claim 1, wherein the reference signal is used as a channel estimation (CE) field of the EDMG packet.

4. The method according to claim 1, wherein the reference signal is used as a training field of the EDMG packet.

5. The method according to claim 1, wherein during multi-antenna transmission, an orthogonal sequence or an orthogonal cover code is used to distinguish between reference signals of different antennas.

6. The method according to claim 1, wherein two adjacent subcarriers occupied by the target sequence are separated by K×M-1 subcarriers, K is 2 raised to a power of a positive integer, M represents a quantity of channels, and M is a positive integer.

7. A reference signal configuration apparatus, comprising:
a processor, configured to generate a reference signal, wherein the reference signal comprises a first part and a second part, the first part and the second part have a same length, and a sum of a DC component of the first part and a DC component of the second part is zero, wherein the processor is further configured to generate an enhanced directional multi-gigabit (EDMG) packet comprising the reference signal, and wherein in an orthogonal frequency division multiplexing (OFDM) mode, a sequence of the first part and a sequence of the second part are generated based on a target sequence in frequency domain, and the target sequence does not occupy a DC subcarrier; and
a transmitter, configured to send the EDMG packet.

8. The apparatus according to claim 7, wherein a sequence of the first part and a sequence of the second part are in-phase sequences, or a sequence of the first part and a sequence of the second part are reverse-phase sequences.

9. The apparatus according to claim 7, wherein the reference signal is used as channel estimation (CE) field of the EDMG packet.

10. The apparatus according to claim 7, wherein the reference signal is used as a training field of the EDMG packet.

11. The apparatus according to claim 7, wherein during multi-antenna transmission, an orthogonal sequence or an orthogonal cover code is used to distinguish between reference signals of different antennas.

* * * * *